(12) United States Patent
Smithies et al.

(10) Patent No.: US 7,942,948 B2
(45) Date of Patent: May 17, 2011

(54) FILTER ELEMENT INCLUDING A COMPOSITE FILTER MEDIA

(75) Inventors: Alan Smithies, Overland Park, KS (US); Jack T. Clements, Lee's Summitt, MO (US); Jason Mei, Overland Park, KS (US)

(73) Assignee: BHA Group, Inc., Kansas City, MO (US)

( * ) Notice: Subject to any disclaimer, the term of this patent is extended or adjusted under 35 U.S.C. 154(b) by 210 days.

(21) Appl. No.: 12/201,631

(22) Filed: Aug. 29, 2008

(65) Prior Publication Data

US 2008/0314011 A1 Dec. 25, 2008

Related U.S. Application Data

(63) Continuation-in-part of application No. 12/184,634, filed on Aug. 1, 2008, which is a continuation-in-part of application No. 11/843,228, filed on Aug. 22, 2007.

(60) Provisional application No. 60/893,008, filed on Mar. 5, 2007.

(51) Int. Cl.
   *B01D 46/00* (2006.01)
(52) U.S. Cl. .............. 55/486; 55/498; 55/521; 55/524; 55/528
(58) Field of Classification Search .............. 55/521, 55/524, 486, 487, 498
See application file for complete search history.

(56) References Cited

U.S. PATENT DOCUMENTS

| | | | |
|---|---|---|---|
| 5,284,704 A | 2/1994 | Kochesky et al. | |
| 5,364,456 A | 11/1994 | Kahlbaugh et al. | |
| 5,437,910 A | 8/1995 | Raabe et al. | |
| 5,792,295 A * | 8/1998 | Huebner et al. | 156/197 |
| 6,165,572 A | 12/2000 | Kahlbaugh et al. | |
| 6,171,354 B1 | 1/2001 | Johnson | |
| 6,274,521 B1 | 8/2001 | Barbier et al. | |

(Continued)

FOREIGN PATENT DOCUMENTS

WO     03080905 A1     10/2003

(Continued)

OTHER PUBLICATIONS

ANSI/ASHRAE Standard 52.2-1999; Method of Testing General Ventilation Air-Cleaning Devices for Removal Efficiency by Particle Size (48 pages); 1999.

*Primary Examiner* — Duane Smith
*Assistant Examiner* — Tiffany N Palmer
(74) *Attorney, Agent, or Firm* — Armstrong Teasdale LLP

(57) ABSTRACT

A filter element includes, in an exemplary embodiment, a first end cap, a second end cap, and a composite filter media structure. The composite filter media structure includes a base substrate that includes a nonwoven synthetic fabric formed from a plurality of bicomponent synthetic fibers with a spunbond process, and having a bond area pattern having a plurality of substantially parallel discontinuous lines of bond area. The base substrate having a minimum filtration efficiency of about 50%, measured in accordance with ASHRAE 52.2-1999 test procedure. The composite filter media structure also includes a nanofiber layer deposited on one side of the base substrate by an by electro-blown spinning process. The composite filter media structure having a minimum filtration efficiency of about 75%, measured in accordance with ASHRAE 52.2-1999 test procedure. The composite media structure further includes a plurality of corrugations formed at a temperature of about 90° C. to about 140° C.

18 Claims, 11 Drawing Sheets

U.S. PATENT DOCUMENTS

| | | | |
|---|---|---|---|
| 6,315,806 B1 | 11/2001 | Torobin et al. | |
| 6,368,386 B1 | 4/2002 | Nelson et al. | |
| 6,395,046 B1 | 5/2002 | Emig et al. | |
| 6,485,811 B1 | 11/2002 | Horiguchi et al. | |
| 6,656,400 B2 | 12/2003 | Veeser et al. | |
| 6,673,136 B2 | 1/2004 | Gallingham et al. | |
| 6,706,086 B2 | 3/2004 | Emig et al. | |
| 6,716,274 B2 | 4/2004 | Gogins et al. | |
| 6,740,142 B2 | 5/2004 | Buettner et al. | |
| 6,743,273 B2 | 6/2004 | Chung et al. | |
| 6,746,517 B2 | 6/2004 | Benson et al. | |
| 6,800,117 B2 | 10/2004 | Barris et al. | |
| 6,875,256 B2 | 4/2005 | Gillingham et al. | |
| 6,924,028 B2 | 8/2005 | Chung et al. | |
| 6,994,742 B2 | 2/2006 | Barris et al. | |
| 7,008,465 B2 | 3/2006 | Graham et al. | |
| 7,090,715 B2 | 8/2006 | Chung et al. | |
| 2004/0060268 A1* | 4/2004 | Chung et al. | 55/482 |
| 2004/0131820 A1* | 7/2004 | Turner et al. | 428/92 |
| 2005/0067732 A1* | 3/2005 | Kim et al. | 264/172.19 |
| 2006/0089072 A1* | 4/2006 | Baker et al. | 442/394 |

FOREIGN PATENT DOCUMENTS

| | | |
|---|---|---|
| WO | 2004018079 A2 | 3/2004 |

* cited by examiner

FILTER ELEMENT INCLUDING A COMPOSITE FILTER MEDIA

CROSS REFERENCE TO RELATED APPLICATIONS

This application is a continuation-in-part of U.S. patent application Ser. No. 12/184,634, filed Aug. 1, 2008, which is a continuation-in-part of U.S. patent application Ser. No. 11/843,228, filed Aug. 22, 2007, which claims priority to Provisional Patent Application Ser. No. 60/893,008, filed Mar. 5, 2007.

BACKGROUND OF THE INVENTION

The field of the invention relates generally to a filter element, and more particularly, to a filter element having a corrugated or embossed composite nonwoven filter media.

Some known filter media composite constructs incorporate a wet-laid paper making process to produce the substrate, and an electro-spun technology to deposit a lightweight nanofiber coating on one or both sides of the filter media substrate. Typically the media substrate has a basis weight of 100-120 grams per square meter (g/m$^2$), and the nanofiber layer has a basis weight of 0.5 g/m$^2$ or less.

It is known that the lightweight nanofiber layer is vulnerable to damage in high mechanical stress applications, especially because the nanofiber layer is formed from fibers with diameters less than 500 nanometer (nm), and more typically, 100 nm. It is known that there are "shedding" problems where the nanofibers are shed from the filter media because of relatively weak attraction bonds between the nanofibers and the base media for conventional electro-spun fibers that rely on polarity attraction forces. Also, known electro-spun nanofiber layers are two dimensional in structure or a single fiber layer in thickness, and when the nanofiber layer cracks or breaks, dust can readily penetrate the base media substrate After the nanofiber layer is damaged, dust is permitted to penetrate the base media and contribute to a rise in the operating pressure drop of the filter. Further, known media substrates also have mechanical stress limitations and are prone to deformation under high dust loading.

These known filter media composite constructs when used to filter inlet air of power generation gas turbines can permit fine dust particulates to penetrate the filter over the operating life of the filter. Typically, this known filter media type will have a new or clean operating efficiency providing for around 55% of capture of 0.4 μm particles, at a pressure drop typically greater than 7.0 mm H$_2$O, when tested in accordance with the ASHRAE 52.2-1999 test procedure at the known operating flow rate. It is known that as much as 15 to 20 pounds of dust can penetrate known filter media over a 24,000 hour operating life because of this low initial efficiency. Exposing the turbine blades to dust over an extended time can cause serious and catastrophic fouling and erosion of the turbine blades. The current procedure of cleaning the turbine blades requires taking the turbine off-line at periodic intervals to water wash the blades clean. Turbine down time is expensive because the turbine is not operating and therefore, power generation is curtailed. It would be desirable to provide a higher efficiency filter media than the known filter media to reduce or eliminate turbine down time to clean the turbine blades and/or the replacement of damaged blades.

BRIEF DESCRIPTION OF THE INVENTION

In one aspect, a filter element is provided that includes a first end cap, a second end cap, and a composite filter media structure. The composite filter media structure includes a base substrate that includes a nonwoven synthetic fabric formed from a plurality of bicomponent synthetic fibers with a spunbond process, and having a bond area pattern having a plurality of substantially parallel discontinuous lines of bond area. The base substrate having a minimum filtration efficiency of about 50%, measured in accordance with ASHRAE 52.2-1999 test procedure. The composite filter media structure also includes a nanofiber layer deposited on one side of the base substrate by an by electro-blown spinning process, with the nanofiber layer including a plurality of nanofibers. The composite filter media structure having a minimum filtration efficiency of about 75%, measured in accordance with ASHRAE 52.2-1999 test procedure. The composite media structure further includes a plurality of corrugations formed using opposing corrugating rollers at a temperature of about 90° C. to about 140° C.

In another aspect, a filter element is provided that includes a first end cap, a second end cap, and a composite filter media structure. The composite filter media structure includes a base substrate that includes a nonwoven synthetic fabric formed from a plurality of bicomponent synthetic fibers with a spunbond process, and having a bond area pattern having a plurality of substantially parallel discontinuous lines of bond area. The base substrate having a minimum filtration efficiency of about 50%, measured in accordance with ASHRAE 52.2-1999 test procedure. The composite filter media structure also includes a nanofiber layer deposited on one side of the base substrate by an by electro-blown spinning process, with the nanofiber layer including a plurality of nanofibers. The composite filter media structure having a minimum filtration efficiency of about 75%, measured in accordance with ASHRAE 52.2-1999 test procedure. The composite media structure further includes an embossing pattern formed using opposing embossing rollers at a temperature of about 90° C. to about 140° C.

DETAILED DESCRIPTION OF THE INVENTION

Figure 1:
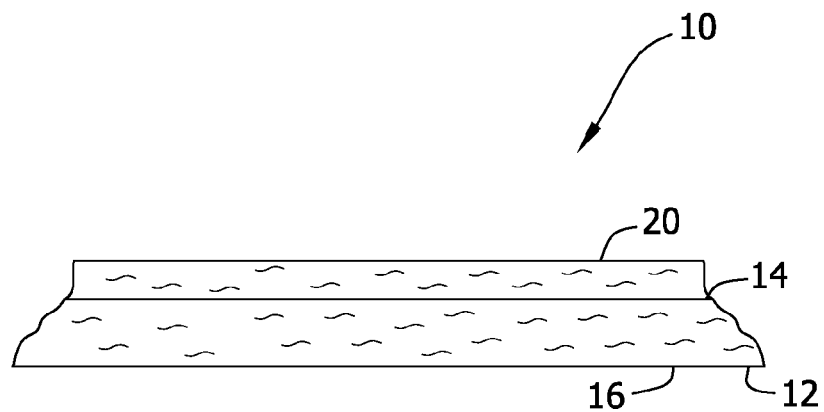
FIG. 1 is cross sectional illustration of an exemplary aspect of a composite filter media.

A filter element that includes composite filter media, and a method of making the composite filter media is described in detail below. The composite filter media includes a media substrate of a synthetic nonwoven fabric that is formed from bicomponent fibers by a unique spunbond process. A nanofiber layer is deposited on at least one side of the media substrate by an electro blowing process. The composite filter media is corrugated or embossed to provide efficient separation of pleats which provides large passageways for low restriction air flow on both the "clean" and "dirty" sides of the composite filter media. The composite media provides an initial filtration efficiency of about 75% retained capture of 0.4 μm particles, when tested in accordance with the American Society of Heating, Refrigerating and Air-Conditioning Engineers (ASHRAE) 52.2-1999 test procedure, which is about a 20% increase in performance compared to known filter media. In addition, the composite media provides the 75% efficiency at a greater than 30% lower pressure drop than known filter media. The composite filter media has a quality factor ($Q_f$) of greater than about 450, and in another embodiment, greater than about 500. Also, the composite filter media has a resistance (or pressure drop) of less than 4.0 mm water, measured in accordance with EN-1822 (1998), with the base media substrate having a resistance of less than about 2.5 mm water, measured in accordance with EN-1822 (1998).

Further, the composite filter media is more durable than known filter media and provides for lower pressure drop build-up because of less deflection of the filter media from the forces exerted on the filter media during the filtering and reverse cleaning operations. Also, the spunbond corrugated media substrate is more efficient than known filter media substrates at an equivalent or lower pressure drop. The bicomponent fibers used to form the media substrate are finer than fibers used to form known filter media. Further, the nanofiber membrane layer has a higher basis weight than known filter media which permits the filter media to clean down more effectively under reverse pulse cleaning than known filter media. The high basis weight of the nanofiber layer provides for a durable three dimensional surface filtration layer which has an extensive tortuous path that permits high efficiency and fine particle capture without substantially restricting air flow or increasing pressure drop. In addition, the adherence bond between the base media substrate and the nanofiber layer is improved due additional thermal processing during the corrugating or embossing operation.

By "quality factor ($Q_f$)" is meant the parameter defined by the equation: $Q_f = -25000 \cdot \log(P/100)/\Delta p$
Where "P"=particle penetration in % of filter media thickness, and "$\Delta p$"=pressure drop across the media in Pascals.

By "resistance" is meant the resistance (pressure drop) as measured using the test method described in EN 1822 (1998).

Referring to the drawings, FIG. 1 is a sectional illustration of an exemplary aspect of a composite filter media 10. Filter media 10 includes a base media substrate 12 having a first side 14 and a second side 16. In one aspect, a nanofiber layer 20 is deposited onto first side 14 of media substrate 12. In another aspect, nanofiber layer 20 is deposited onto second side 16, and in another aspect, nanofiber layer 20 is deposited on each of first and second sides 14 and 16. In still another aspect, base media substrate 12 does not include a nanofiber layer. In another exemplary aspect, a plurality of corrugations 18 (shown in FIG. 5) are formed in filter media 10.

Figure 2:
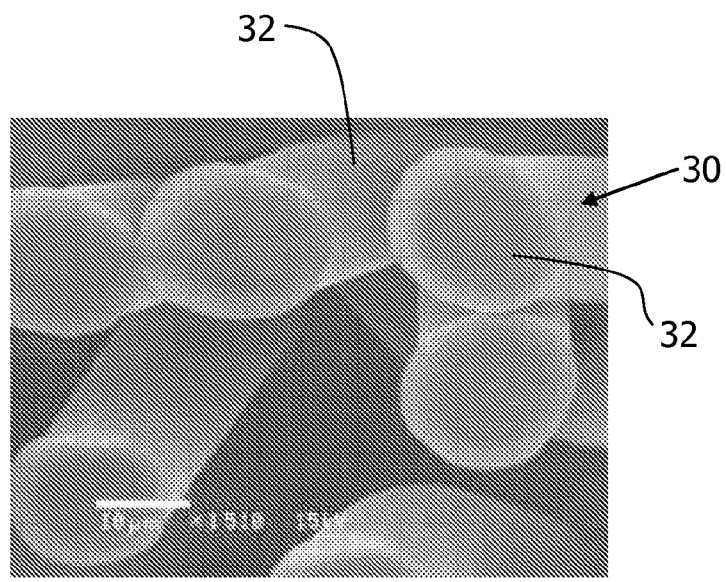
FIG. 2 is a photomicrograph of bicomponent fibers used in the filter media shown in FIG. 1.
Figure 3:
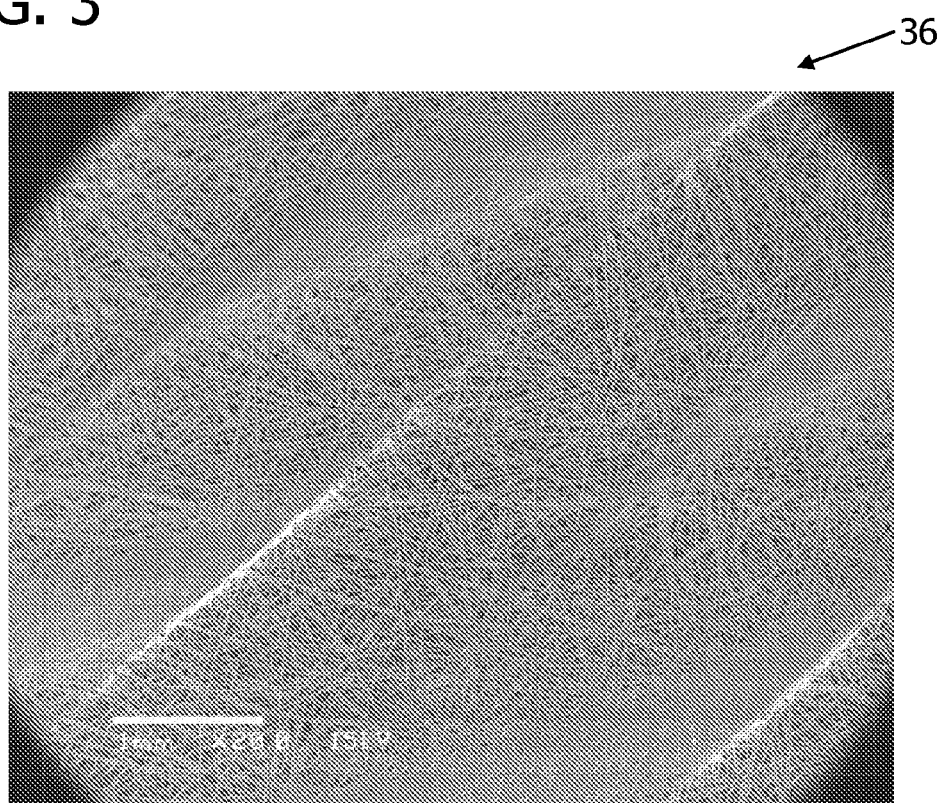
FIG. 3 is a photomicrograph of the base media substrate shown in FIG. 1.

Media substrate 12 is a nonwoven fabric formed from synthetic bicomponent fibers using a spunbond process. Suitable bicomponent fibers are fibers having a core-sheath structure, an island structure or a side-by-side structure. Referring also to FIG. 2, in the exemplary embodiment, a bicomponent fiber 30 includes a core 32 and a sheath 34 circumferentially surrounding core 32. Bicomponent fibers 30 are meltspun through jets into a plurality of continuous fibers which are uniformly deposited into a random three dimensional web. The web is then heated and embossed calendered which thermally bonds the web into a consolidated spunbond fabric 36, shown in FIG. 3. Heat from contact of the calender roll embossing pattern softens or melts the thermoplastic sheath 34 of bicomponent fibers 30 which binds the nonwoven fibers together only at the contact points of calendar roll embossing pattern. The temperature is selected so that at least softening or fusing of the lower melting point sheath 34 portion of bicomponent fibers 30 occurs. In one embodiment, the temperature is about 90° C. to about 240° C. The desired connection of the fibers is caused by the melting and re-solidification of sheath portion 34 after cooling.

Bicomponent fibers 30 have diameter of about 12 microns to about 18 microns which is finer than the known fibers used in traditional and common spunbond products. A unique aspect of base media substrate 12 is the bond pattern used to consolidate spunbond base media 12. The bond pattern is defined by the embossing pattern of the calender rolls. The bond area of the spunbond bicomponent fibers in media 12 is about 10 percent to about 14 percent of the total area of the fabric as compared to the bond area of about 29 to 24 percent of traditional spunbond media used in filtration. The bond area provides for media durability and function while at the same time the bond points create areas of fused polymer that have zero air flow.

Figure 4:
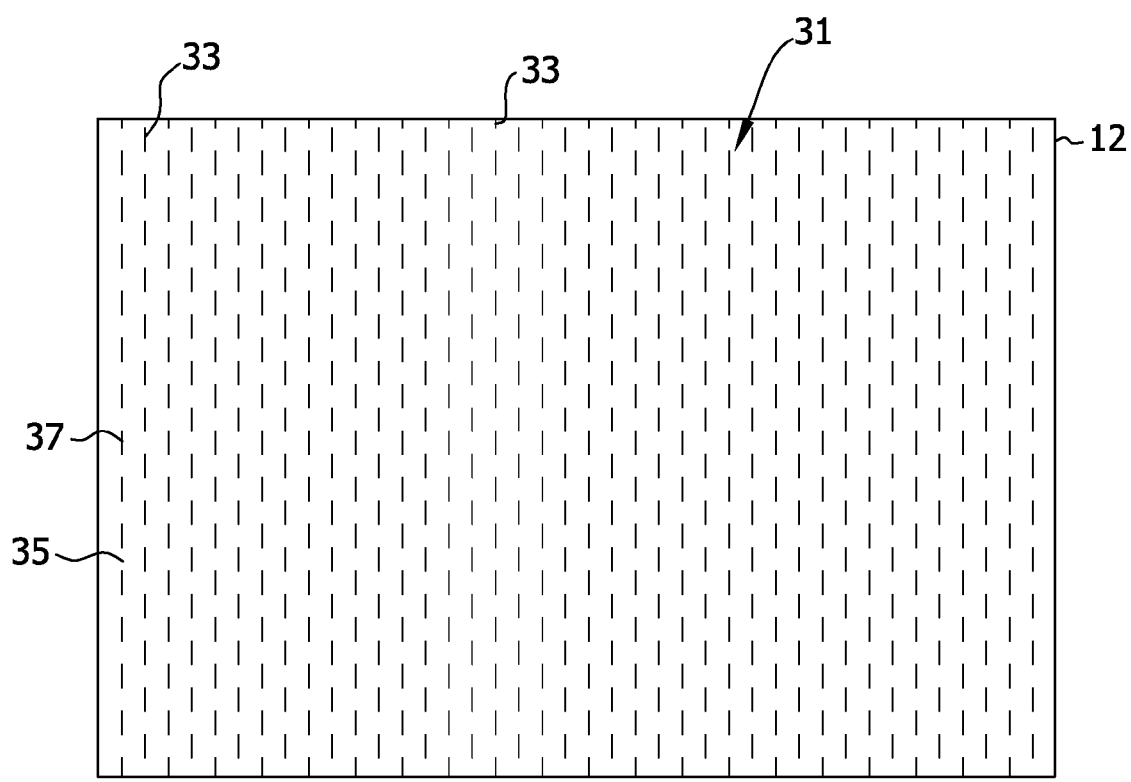
FIG. 4 is a top illustration of the bond pattern of the base media substrate shown in FIG. 1.

Referring also to FIG. 4, a bond pattern 31 on base media 12 attains an acceptable durability to base media 12, while allowing more fiber to be available for filtration thus increasing filtration efficiency. Bond pattern 31 includes a plurality of parallel discontinuous lines 33 of bond area extending across base media 12 and in a direction parallel to the machine direction (longitudinal extent) of base media 12. The parallel discontinuous lines 33 of bond area are off-set from each other so that at a location of no bond area 35 in a discontinuous line 33 is aligned with a bond area 37 of an adjacent discontinuous line 33. The bond area 37 of spunbond bicomponent fibers 30 in media 12 is about 10 percent to about 16 percent of the total area of the fabric as compared to the bond area of about 19 to 24 percent of known spunbond fabrics. The lower bond areas allow for base media 12 to have increase air permeability or inversely low pressure drop when tested at a given air flow. In the exemplary embodiment the basis weight of base media 12 is about 100 g/m$^2$ to about 330 g/m$^2$, in another embodiment, about 100 g/m$^2$ to about 220 g/m$^2$.

Any suitable synthetic bicomponent fiber 30 can be used to make the nonwoven fabric of media substrate 12. Suitable materials for core 32 and sheath 34 of bicomponent fiber 30 include, but are not limited to, polyester, polyamid, polyolefin, thermoplastic polyurethane, polyetherimide, polyphenyl ether, polyphenylene sulfide, polysulfone, aramid, and mixtures thereof. Suitable materials for the sheath of the bicomponent fiber include thermoplastic materials that have a lower melting point than the material of the core of the bi-component fiber, for example polyester, polyamid, polyolefin, thermoplastic polyurethane, polyetherimide, polyphenyl ether, polyphenylene sulfide, polysulfone, aramid, and mixtures thereof.

Nanofiber layer 20 is formed by an electro-blown spinning process that includes feeding a polymer solution into a spinning nozzle, applying a high voltage to the spinning nozzle, and discharging the polymer solution through the spinning nozzle while injecting compressed into the lower end of the spinning nozzle. The applied high voltage ranges from about 1 kV to about 300 kV. The electro-blown spinning process of forming nanofibers and the unique apparatus used is described in detail in U.S. Patent Application Publication No. 2005/0067732. The electro-blown spinning process provides a durable three dimensional filtration layer of nanofibers that is thicker than known nanofiber filtration layers on known filter media. In the exemplary aspect the basis weight of nanofiber membrane layer 20 is about 0.6 g/m$^2$ to about 20 g/m$^2$, in another aspect, about 5 g/m$^2$ to about 10 g/m$^2$. The nanofibers in nanofiber layer 20 have an average diameter of about 500 nm or less.

Media substrate 12 has a high air permeability compared to known filter media which permits improved mechanical adhesion of the nanofibers to media substrate 12, as described below. As nanofiber layer 20 is applied to first side 14 of media substrate 12, a vacuum may be applied from second side 16 of media substrate during the electro-blown spinning process to hold the nanofibers on the substrate. In combination with the drying temperatures used in the application of nanofiber layer 12, softening of sheath portion 34 of bicomponent fiber 30 occurs and nanofiber layer 20 is further densified and bonded to spunbond base media substrate 12. In combination with the high air permeability of media substrate 12, the effectiveness of the vacuum becomes more effective which provides for a strong mechanical bond of the nanofibers to the bicomponent fibers of media substrate 12.

Suitable polymers for forming nanofibers by the electro-blown spinning process are not restricted to thermoplastic polymers, and may include thermosetting polymers. Suitable polymers include, but are not limited to, polyimides, polyamides (nylon), polyaramides, polybenzimidazoles, polyetherimides, polyacrylonitriles, polyethylene terephthalate, polypropylene, polyanilines, polyethylene oxides, polyethylene naphthalates, polybutylene terephthalate, styrene butadiene rubber, polystyrene, polyvinyl chloride, polyvinyl alcohol, polyvinylidene chloride, polyvinyl butylene and copolymer or derivative compounds thereof. The polymer solution is prepared by selecting a solvent that dissolves the selected polymers. The polymer solution can be mixed with additives, for example, plasticizers, ultraviolet ray stabilizers, crosslink agents, curing agents, reaction initiators, and the like. Although dissolving the polymers may not require any specific temperature ranges, heating may be needed for assisting the dissolution reaction.

It can be advantageous to add plasticizers to the various polymers described above, in order to reduce the $T_g$ of the fiber polymer. Suitable plasticizers will depend upon the polymer, as well as upon the particular end use of the nanofiber layer. For example, nylon polymers can be plasticized with water or even residual solvent remaining from the electrospinning or electro-blown spinning process. Other plasticizers which can be useful in lowering polymer $T_g$ include, but are not limited to, aliphatic glycols, aromatic sulphanomides, phthalate esters, including but not limited to, dibutyl phthalate, dihexl phthalate, dicyclohexyl phthalate, dioctyl phthalate, diisodecyl phthalate, diundecyl phthalate, didodecanyl phthalate, and diphenyl phthalate, and the like.

Figure 5:
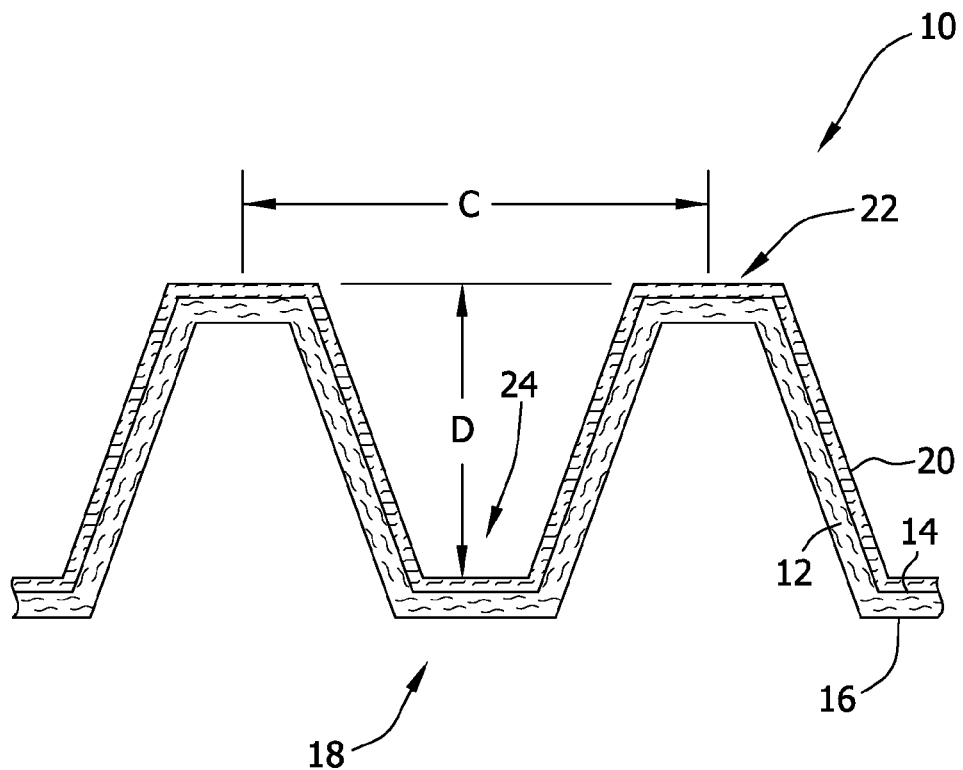
FIG. 5 is cross sectional illustration of an exemplary aspect of the composite filter media shown in FIG. 1 after corrugating.

Referring also to FIG. 5, in the exemplary aspect, corrugations 18 are formed as an alternating up and down substantially V-shaped wave in composite filter media 10. Wave crests 22 and troughs 24 extend in the direction of travel of the web of substrate through the forming equipment. Troughs 24 have an effective depth D of at least about 0.02 inch (0.5 mm) to permit breathability of filter media 10 at high dust loading to maintain low differential pressure, below about 4 inches water column (wc). A corrugation pitch C in the exemplary aspect is about 3 to about 10 corrugations per inch (about 1.2 to about 3.9 corrugations per cm), and in another aspect, from about 3 to about 6 corrugations per inch (about 1.2 to about 2.4 corrugations per cm). The combination of effective depth D and corrugation pitch C permit optimization of touch points which prevents pleat collapse under high static pressure from high air velocities and dust loadings.

Figure 6:
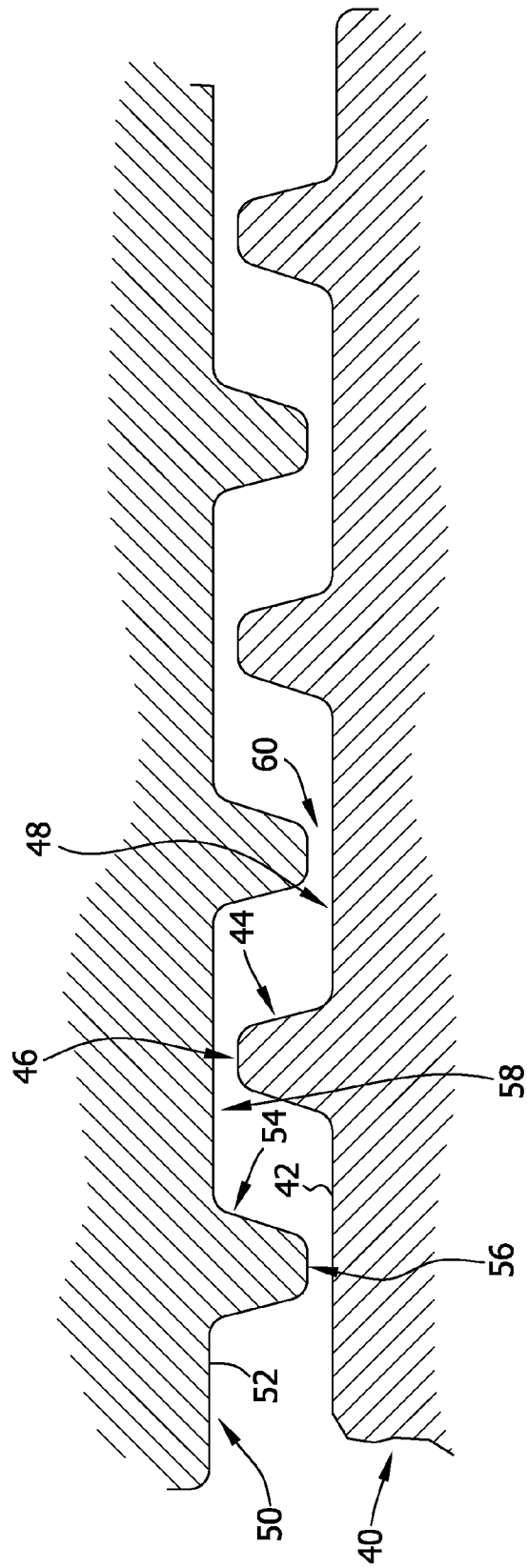
FIG. 6 is a cross sectional illustration of corrugation rollers in accordance with an exemplary aspect.

Referring also to FIG. 6, opposing profiled corrugating rolls produce a uniform corrugation over the entire cross-section of filter media 10. A lower corrugating roller 40 includes an outer surface 42 having a plurality of substantially V shaped ribs 44 extending circumferentially around lower roller 40. Ribs 44 are substantially evenly spaced apart along the width of outer surface 42 of lower roller 40 so that outer surface 42 has a plurality of peaks 46 and valleys 48. An upper corrugating roller 50 includes an outer surface 52 having a plurality of substantially V shaped ribs 54 extending circumferentially around upper roller 50. Ribs 54 are substantially evenly spaced apart along the width of outer surface 52 of upper roller 50 so that outer surface 52 has a plurality of peaks 56 and valleys 58. Ribs 44 of lower roller 40 are aligned with valleys 58 of upper roller 50 and ribs 54 of upper roller 50 are aligned with valleys 48 of lower roller 40. The width of ribs 44 and 54 can be any suitable width up to the width of opposing valleys 48 and 58 of lower and upper rollers 40 and 50. A space 60 between ribs 44 and 54 and valleys 48 and 58 respectively define a nip between lower and upper rollers 40 and 50. The nip is less than the thickness of filter media 10 which consolidates filter media 10 when passed between ribs 44 and 54 and respective valleys 48 and 58. The consolidation of filter media 10 at the nip sets corrugations 18 into filter media 10. In operation, the temperature of corrugating rollers 40 and 50 is about 90° C. to about 140° C.

Figure 7:
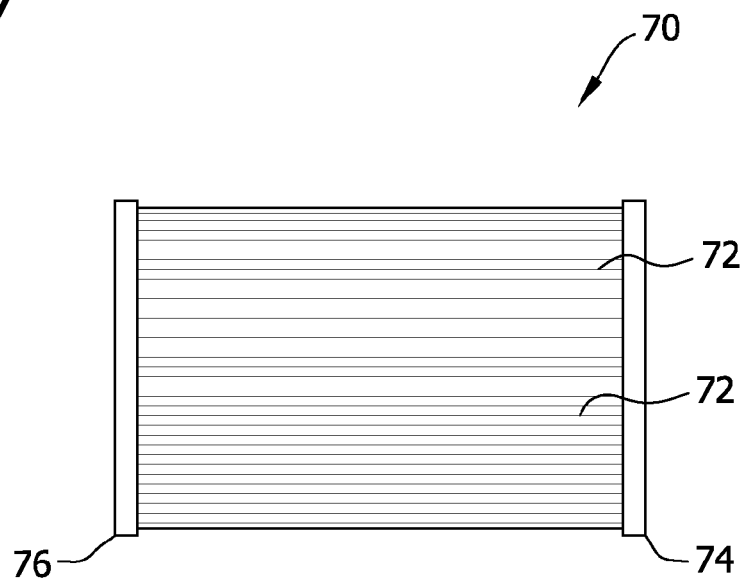
FIG. 7 is a side illustration of a filter cartridge that includes the filter media shown in FIG. 4.
Figure 8:
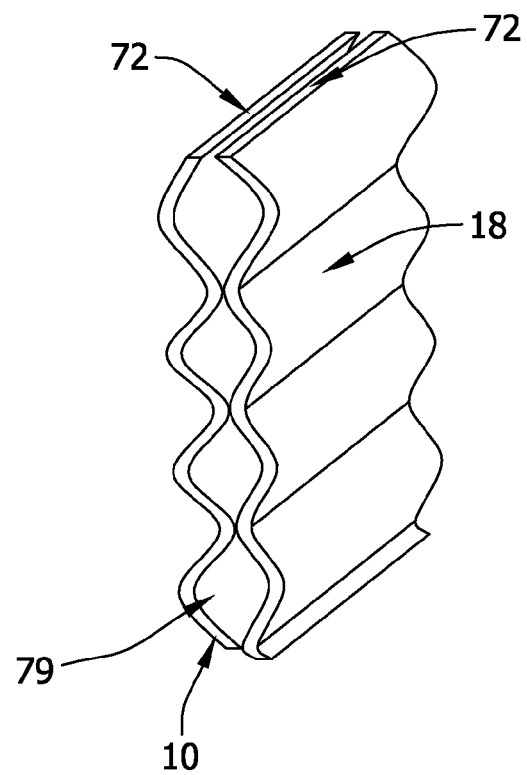
FIG. 8 is an enlarged perspective illustration of a portion of the filter cartridge shown in FIG. 7.
Figure 9:
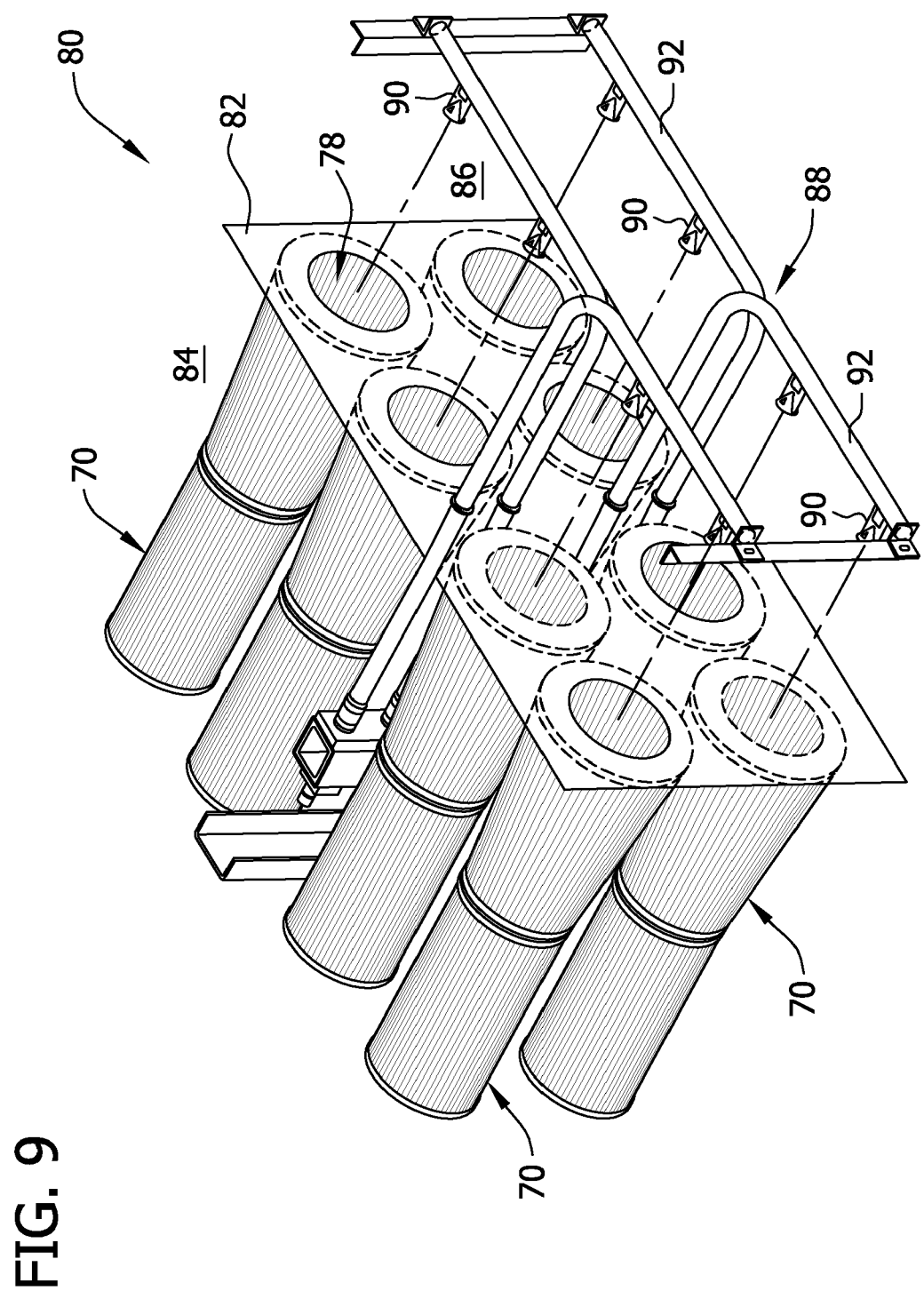
FIG. 9 is a perspective illustration of a filter assembly that includes the filter cartridge shown in FIG. 7.

FIG. 7 is a side illustration of a filter element 70 formed from filter media 10. In the exemplary aspect, filter media 10 includes a plurality of pleats 72 arranged so that corrugations 18 act as spacers between pleats 72. Filter element 70 includes a first end cap 74 and an opposing second end cap 76 with filter media 10 extending between end caps 74 and 76. Filter element 70 has a tubular shape with an interior conduit 78 (shown in FIG. 9). Filter element 70 is cylindrical in shape, but can also be conical as shown in FIG. 9. Filter element 70 can also include an inner and/or an outer support liner to provide structural integrity of filter element 70 and/or support for filter media 10. As shown in FIG. 8, corrugations 18 in adjacent pleats 72 of filter element 70 define oval tubes 79 which permit filtered air to flow through filter element 70. In the exemplary embodiment, corrugations 18 extend substantially perpendicular to the edges of pleats 72.

FIG. 9 is a perspective illustration of a filter assembly 80 that includes a plurality of filter elements 70 mounted to a tube sheet 82 in pairs in an end to end relationship. Tube sheet 82 separates the dirty air side 84 from the clean air side 86 of filter assembly 80. A cleaning system 88 for cleaning filter elements 70 with pulsed air includes a plurality of air nozzles 90 mounted to air supply pipes 92. Pulses of compressed air directed into interior conduit 78 of filter elements 70 are used to clean filter elements 70 of collected dirt and dust.

Figure 10:
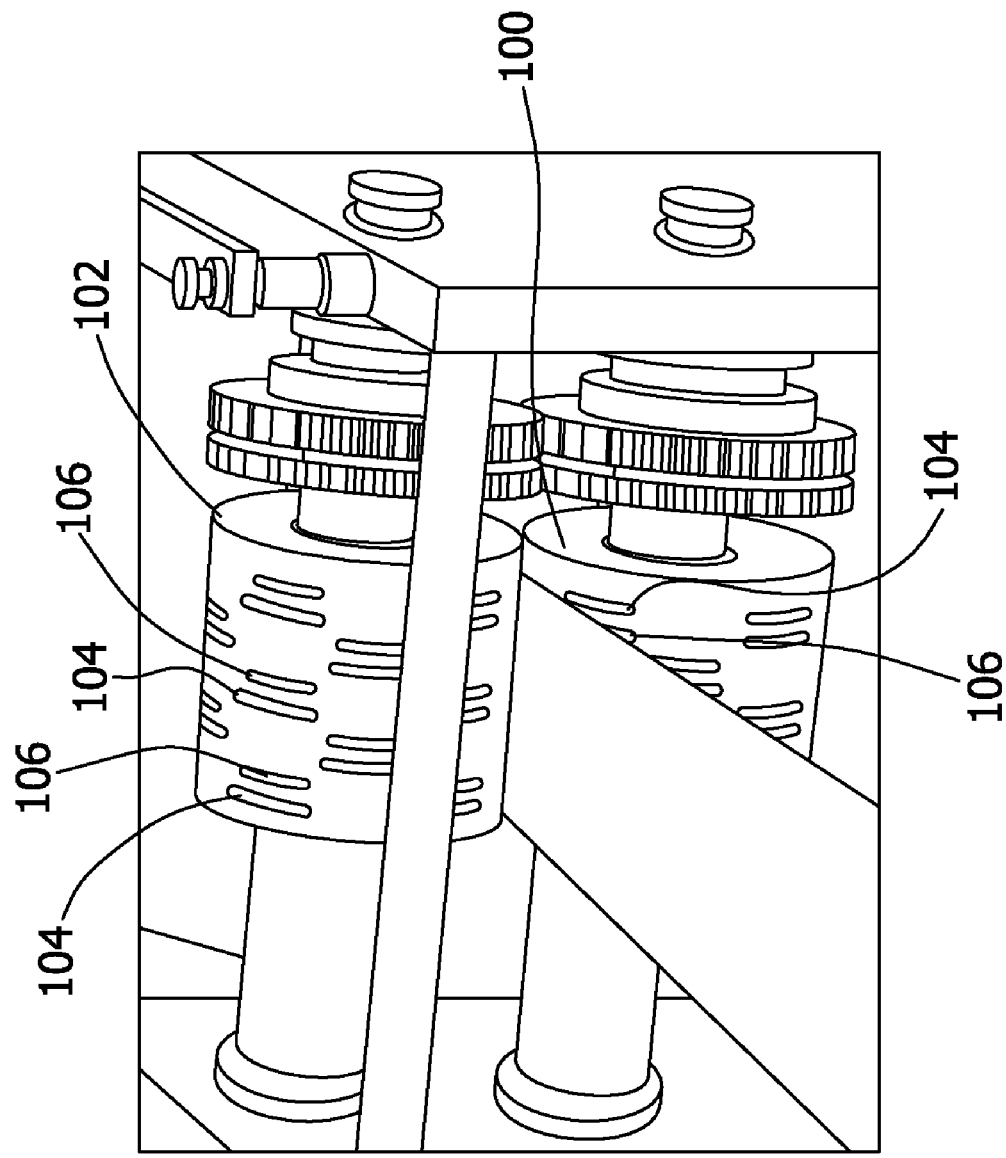
FIG. 10 is a schematic illustration of embossing rollers in accordance with an exemplary aspect.

In another exemplary aspect, filter media 10 is embossed using opposed embossing rolls. FIG. 10 is a schematic illustration of a lower embossing roller 100 and an upper embossing roller 102. A plurality of pairs of a rib 104 and a channel 106 are located in an outer surface 108 of lower and upper embossing rollers 100 and 102. Each rib 104 and each channel 106 extend along a portion of the circumference of embossing roller 100 or 102. Also, each pair of a rib 104 and a channel 106 on lower embossing roller 100 is aligned with a corresponding pair of a rib 104 and a channel 106 on upper embossing roller 102 with the ribs and channels arranged so that each rib 104 on lower roller 100 is aligned with and mates with a channel 106 on upper roller 102, and each rib 104 on upper roller 102 is aligned with and mates with a channel 106 on lower roller 102. The plurality of pairs of ribs 104 and channels 106 are spaced apart across embossing rollers 100 and 102 in staggered rows which define an embossing pattern.

Composite filter media 10 is made by forming nonwoven fabric base substrate 12 using a plurality of bicomponent synthetic fibers 30 with a spunbond process. Base substrate 12 is then calendered with embossing calender rolls to form a bond area pattern 31 having a plurality of substantially parallel discontinuous lines 33 of bond area to bond synthetic bicomponent fibers 30 together to form nonwoven fabric base substrate 12. The formed substrate 12 has a filtration efficiency of at least about 50%, measured in accordance with ASHRAE 52.2-1999 test procedure. A nanofiber layer 20 is applied by electro-blown spinning a polymer solution to form a plurality of nanofibers on at least one side of base substrate 12 to form composite filter media 10. The resultant composite filter media has a filtration efficiency of at least about 75%, measured in accordance with ASHRAE 52.2-1999 test procedure. Composite filter media 10 is then corrugated using opposing corrugating rollers 40 and 50 at a temperature of about 90° C. to about 140° C. In an alternate embodiment, composite filter media 10 is embossed using opposing embossing rollers 100 and 102 at a temperature of about 90° C. to about 140° C.

The invention will be further described by reference to the following examples which are presented for the purpose of illustration only and are not intended to limit the scope of the invention.

Figure 11:
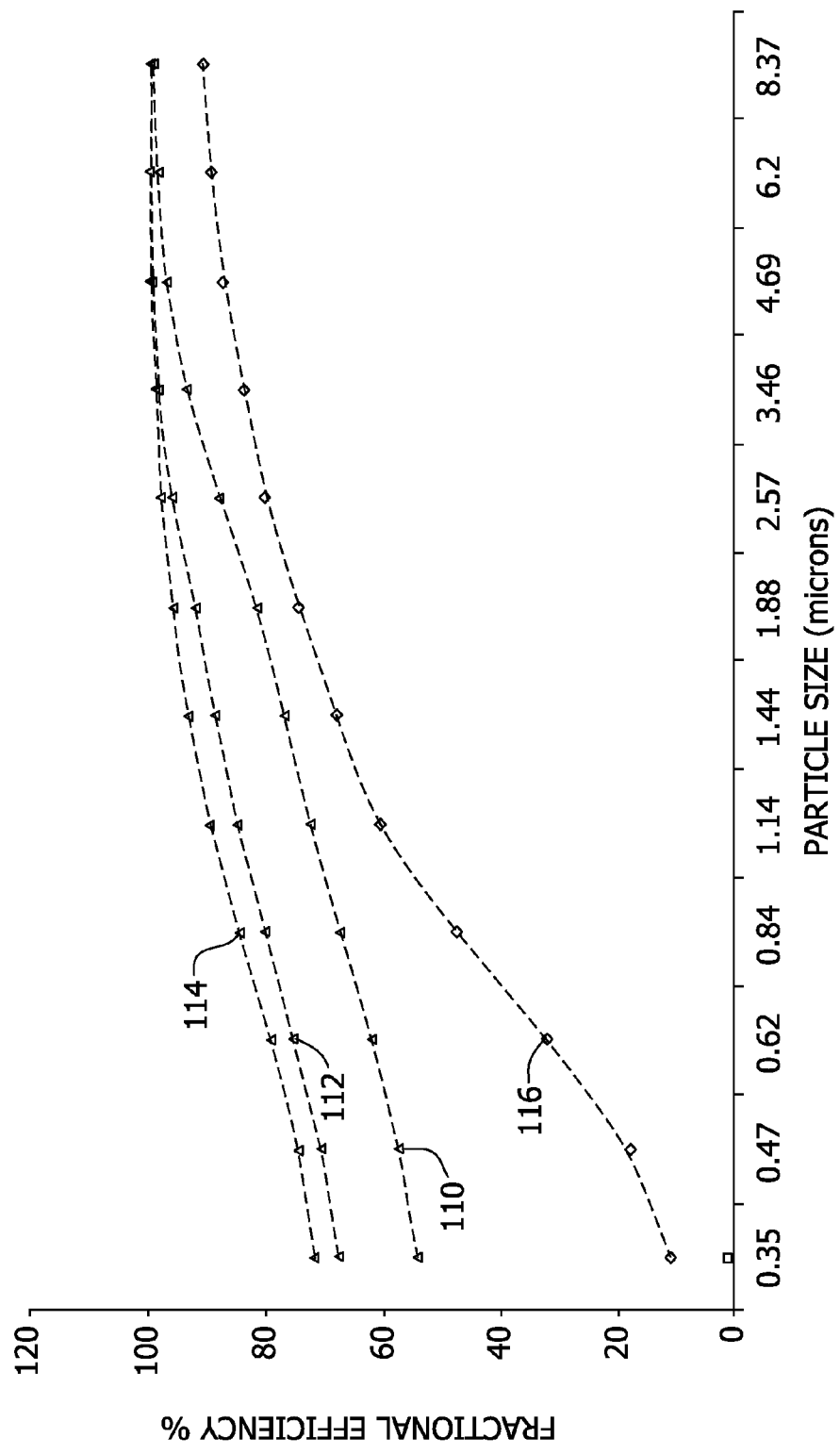
FIG. 11 is a graph of fractional efficiency versus particle size of base media substrates at various basis weights in accordance with an exemplary aspect.

Flat sheets of base media substrate 12 test samples having various basis weights were compared to a comparative base media substrate in a flat sheet fractional efficiency test in accordance ASHRAE 52.2-1999 test method. Air containing KCl particles was directed through each test sample at a flow rate of about 10 ft/min. FIG. 11 shows a graphical representation of the comparison test. Line 110 represents base substrate 12 at a basis weight of 150 g/m$^2$, line 112 represents base substrate 12 at a basis weight of 200 g/m$^2$, and line 114 represents base substrate 12 at a basis weight of 260 g/m$^2$. Line 116 represents a comparative base media substrate. The base media substrates did not include a nanofiber layer. Base media substrate 12 at each basis weight has a higher efficiency than the comparative base substrate over the entire range of particle sizes of the KCl particles.

Figure 12:
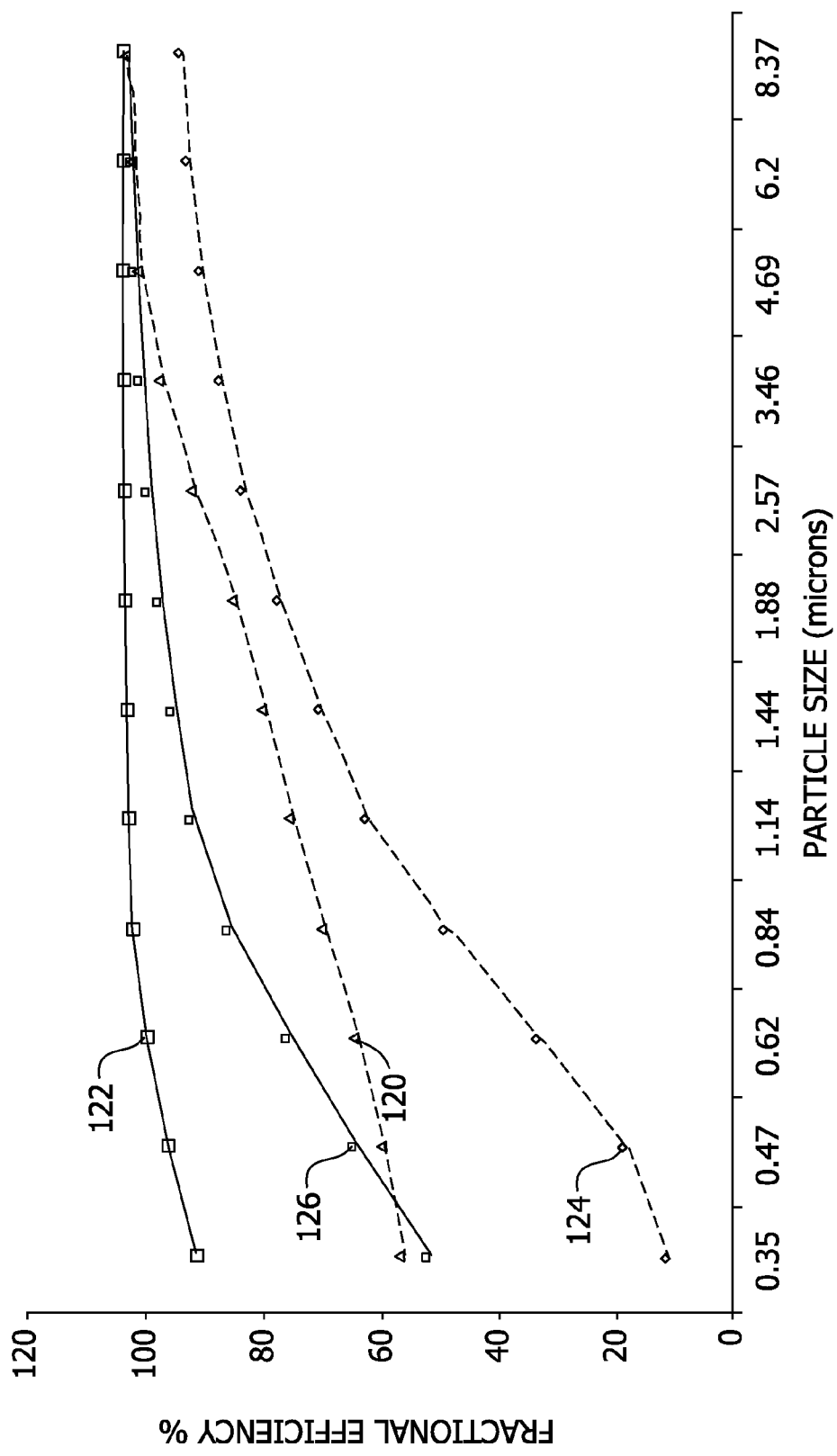
FIG. 12 is a graph of fractional efficiency versus particle size of base media substrates with and without a nonfiber layer in accordance with an exemplary aspect compared to a comparative base media substrate with and without a nanofiber layer.

Flat sheets of base media substrate 12, and base media substrate 12 including nanofiber layer 20 were compared to a comparative base media substrate with and without a nanofiber layer in a flat sheet fractional efficiency test in accordance ASHRAE 52.2-1999 test method. Air containing KCl particles was directed through each test sample at a flow rate of about 10 ft/min. FIG. 12 shows a graphical representation of the comparison test. Line 120 represents base media substrate 12 at 150 g/m$^2$, and line 122 represents base media substrate 12 at 150 g/m$^2$, including nanofiber layer 20. Line 124 represents a comparative base media substrate and line 126 represents the comparative base media substrate including a nanofiber layer. Base media substrate 12 with and without nanofiber layer 20 had a higher efficiency than the comparative base substrate with and without a nanofiber layer over the entire range of particle sizes of the KCl particles.

Figure 13:
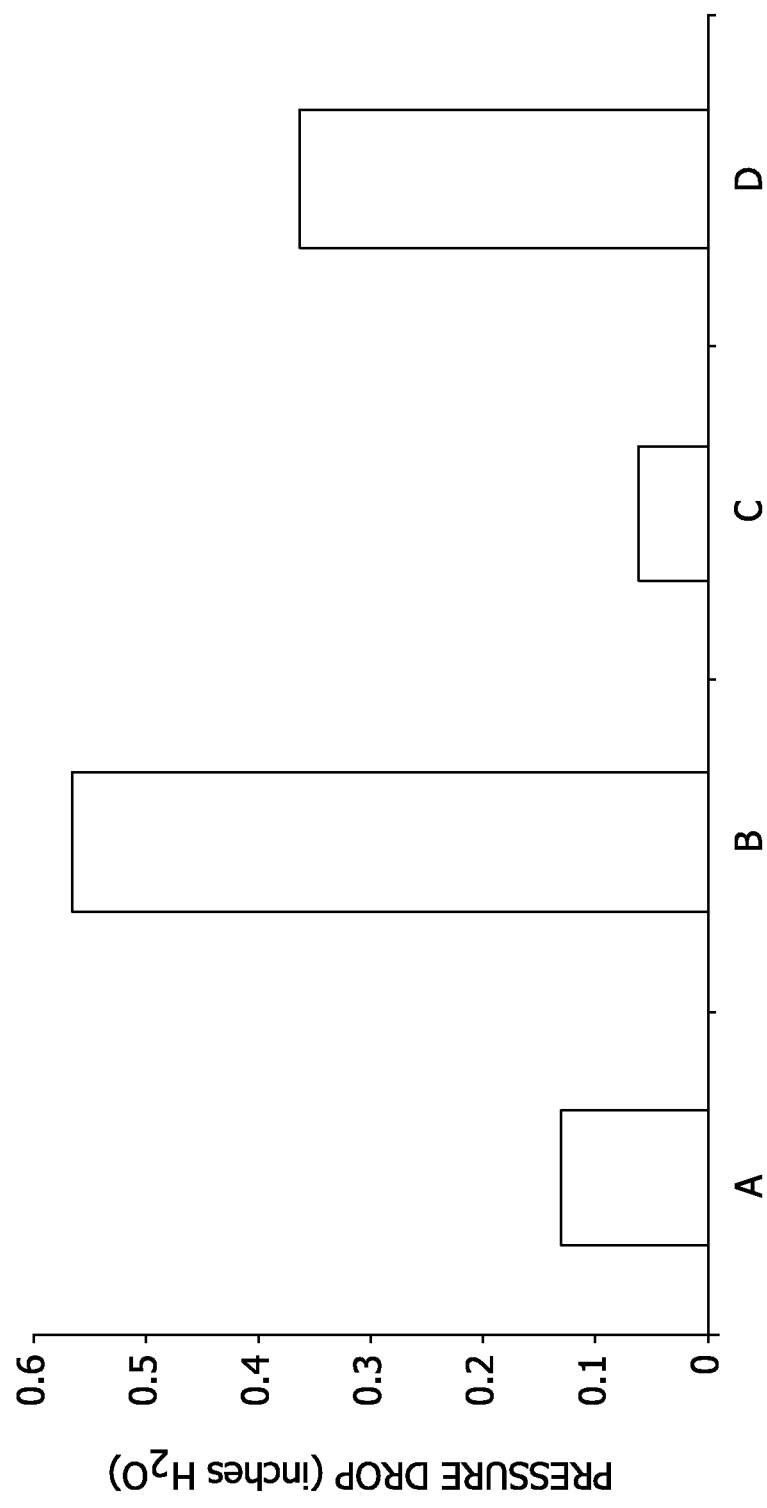
FIG. 13 is a bar graph of pressure drop versus base media substrate with and without a nonfiber layer in accordance with an exemplary aspect compared to a comparative base media substrate with and without a nanofiber layer.

Flat sheets of base media substrate 12, and base media substrate 12 including nanofiber layer 20 were compared to a comparative base media substrate with and without a nanofiber layer in a flat sheet pressure drop test in accordance ASHRAE 52.2-1999 test method. Air containing KCl particles was directed through each test sample at a flow rate of about 10 ft/min. FIG. 13 shows a graphical representation of the comparison test. Bar A represents a comparative base media substrate and bar B represents the comparative base media substrate including a nanofiber layer. Bar C represents base media substrate 12 at 150 g/m$^2$, and bar D represents base media substrate 12 at 150 g/m$^2$, including nanofiber layer 20. Base media substrate 12 with and without nanofiber layer 20 had a lower pressure drop than the comparative base substrate with and without a nanofiber layer.

Corrugated strips of composite filter media 10, including nanofiber layer 20, were pleated and compared to a comparative known filter media with a nanofiber layer for differential pressure over time by using a modified ASTM D-6830-02 test method. The test method tested the filter media under simulated conditions found in full size dust collectors. Standardized dust was drawn from a slip stream at a controlled volume (constant air to media ratio) through the test media, and pressure drop versus time was recorded. Reverse pulse-jet cleaning, at specified intervals, back-flushed the filter media to purge collected dust. The modifications to ASTM D-6830-02 were as follows The dust feed was set at 100 grams/hour, which resulted in a filter dust load of approximately 0.5 g/m$^3$. In place of the fabric clamping ring, an adapter plate for pleated filter cassettes with a test cassette was mounted in place in the filter holding nozzle assembly of the cylindrical extraction tube. The raw gas airflow was set at 10 m$^3$/hr. The filter cassette module flow was set at 4.65 m$^3$/hour. Each filter cassette contained a nominal 0.085 m$^2$ (0.91 ft$^2$) of filter media using a standard 48 mm high pleat (unless otherwise indicated). The exposed pleat pack consisted of 11 full pleats, 3 inches long. The flow setting resulted in an apparent face velocity of 3.0 fpm. Pulse air was set at 0.5 kPa (75 psig). Pulse cleaning started 15 minutes after start of the test. Cleaning intervals were based on time intervals of 900 seconds. The test dust was aluminum oxide having an average particle size of about 1.5 micron, Pural NF, commercially available from Condea Chemie GmbH. Total elapsed test time was 10 hours. No filter conditioning period was used.

Figure 14:
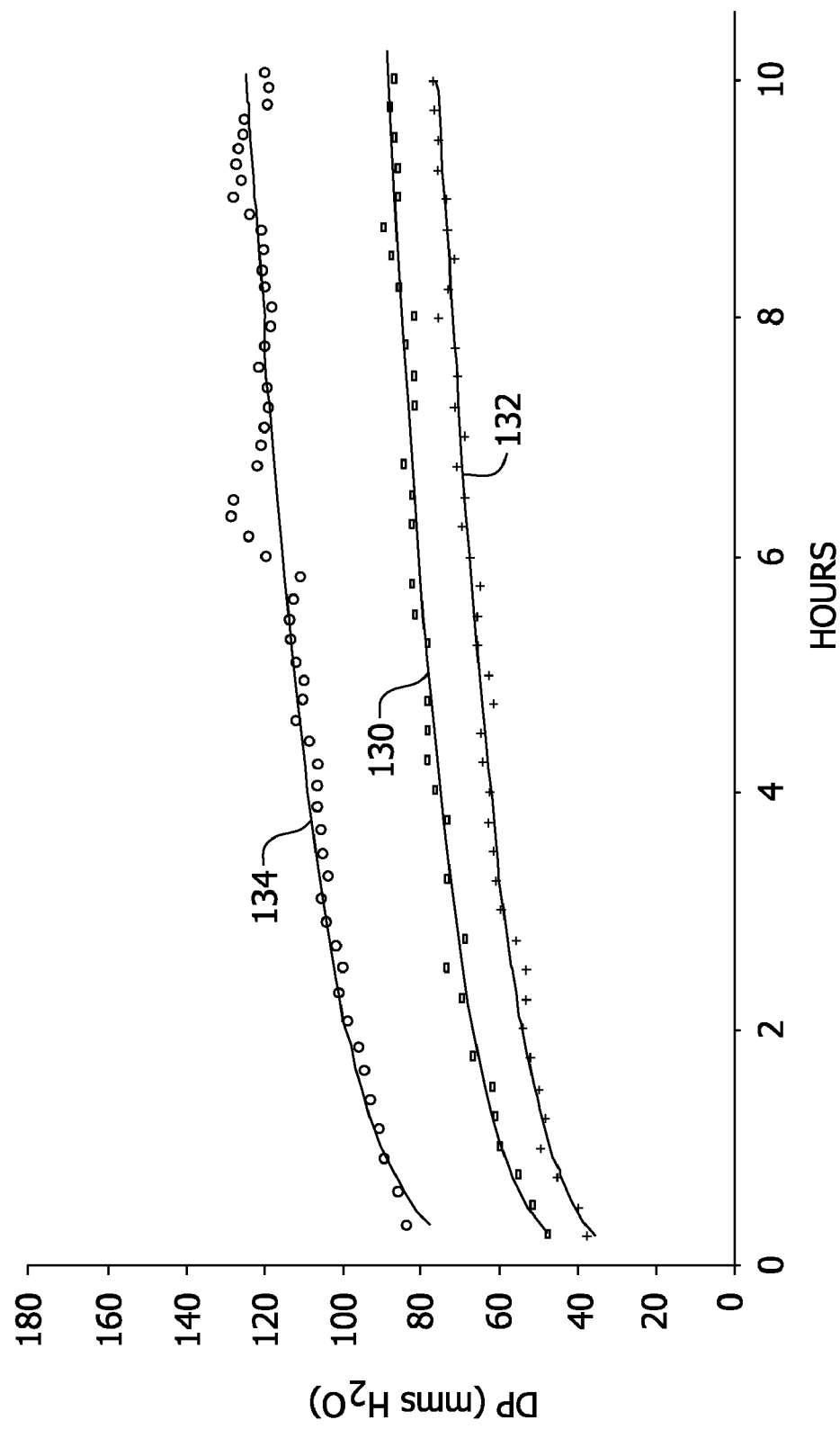
FIG. 14 is a graph of differential pressure versus hours of base media substrate with a nonfiber layer in accordance with an exemplary aspect compared to a comparative base media substrate with a nanofiber layer.

FIG. 14 shows a graphical representation of the comparison test. Line 130 represents composite filter media 10 having a 48 mm pleat height, line 132 represents filter composite media 10 having a 42 mm pleat height, and line 134 represents a known comparative filter media. Filter media 10 test samples having either 42 mm or 48 mm pleat height had significantly a lower differential pressure over the length of the 10 hour test.

The above described filter elements 70 formed from filter media 10 can be used for filtering an air stream in almost any application, for example, for filtering gas turbine inlet air. The unique construction of filter media 12 is more durable than known filter media and provides for lower pressure drop build-up because of less deflection from the forces exerted on the filter media during the filtering and reverse cleaning operations due to the corrugation construction. Filter elements 70 have produced an average efficiency greater than about 75% capture of the most penetrating particle size of aerosol or dust (about 0.3 to about 0.4 micron) as compared to about 50-55% of known filter elements. Also, nanofiber layer 20 has a higher basis weight than known filter media which permits filter media 12 to clean down more effectively under reverse pulse cleaning than known filter media. Further, the high basis weight of nanofiber layer 20 provides for a durable three dimensional surface filtration layer which has an extensive tortuous path that permits high efficiency and fine particle capture without restricting air flow or increasing pressure drop.

The example filter media of Examples 1-2 and Comparative Examples 3-7 illustrate a comparison of embodiments of filter media 10 with known filter media. Efficiency, resistance and quality factor were measured for each filter media of Examples 1-2 and Comparative Examples 3-7. Efficiency was measured in accordance with ASHRAE 52.2-1999 test procedure, resistance was measured in accordance with EN-1822 (1998), and quality factor $Q_f$ was calculated as described above.

Example 1 is a spunbond polyester bicomponent fiber base media substrate, and Example 2 is the base media substrate of Example 1 plus a 2 g/m² nanofiber layer formed by an electro-blown spinning process. Comparative Example 3 is a known drylaid polyester base media substrate, and Comparative Example 4 is the known dry-laid polyester base media substrate of Comparative Example 3 plus a 2 g/m² nanofiber layer. Comparative Example 5 is a wet-laid synthetic paper plus a <0.5 g/m² nanofiber layer. Comparative Example 6 is a wet-laid synthetic paper, and Comparative Example 7 is the wet-laid synthetic paper of Example 6 plus a 20 g/m² melt-blown fiber layer. The example results are shown in Table I below. When Example 2 is compared to composites in Comparative Examples 4, 5, and 7 efficiency is not sacrificed at the expense of reducing resistance which yields the associated high Quality Factor values.

TABLE I

| Example | Basis Weight (g/m²) | Efficiency (%) | Resistance (mm H₂O) | Quality Factor |
|---|---|---|---|---|
| Example 1 Spunbond Polyester Bicomponent Fiber Base | 158.6 | 57.0 | 1.78 | 525 |
| Example 2 Spunbond Polyester Bicomponent Fiber Base + 2 g/m² Nanofiber Layer | 154.6 | 80.2 | 3.43 | 534 |
| Comparative Example 3 Drylaid Polyester Base | 234.9 | 28.7 | 9.3 | 40 |
| Comparative Example 4 Drylaid Polyester Base + 2 g/m² Nanofiber Layer | 236.3 | 43.2 | 13.81 | 45 |
| Comparative Example 5 Wet laid Synthetic Paper + <0.5 g/m² Nanofiber Layer | 121.2 | 40.5 | 9.77 | 59 |
| Comparative Example 6 Wetlaid Synthetic Paper | 133.4 | 9.0 | 7.67 | 14 |
| Comparative Example 7 Wetlaid Synthetic Paper + 20 g/m² Meltblown Fiber Layer | 150.2 | 86.4 | 8.79 | 251 |

Efficiency measured at 0.3 microns, 5.3 cm/s face velocity (ASHRAE 52.2-1999).
Resistance measured in accordance with EN-1822 (1998).
Quality Factor defined by the equation: $Q_f = -25000 \cdot \log(P/100)/\Delta p$ This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A filter element comprising a first end cap, a second end cap, and a composite filter media structure, the composite filter media structure comprising:
    a base substrate comprising a nonwoven synthetic fabric formed from a plurality of bicomponent synthetic fibers with a spunbond process, said nonwoven synthetic fabric comprises a bond area of about 10% to about 14% of an area of said nonwoven fabric, said bond area pattern comprising a plurality of substantially parallel discontinuous lines of bond area, said base substrate having a minimum filtration efficiency of about 50%, measured in accordance with ASHRAE 52.2-1999 test procedure; and
    a nanofiber layer deposited on one side of said base substrate by an by electro-blown spinning process, said nanofiber layer comprising a plurality of nanofibers, said composite filter media structure having a minimum filtration efficiency of about 75%, measured in accordance with ASHRAE 52.2-1999 test procedure,
    said composite media structure further comprising a plurality of corrugations, said corrugations formed using opposing corrugating rollers at a temperature of about 90° C. to about 140° C.

2. A filter element in accordance with claim 1 wherein the plurality of bicomponent fibers comprise a core material and a sheath material, the sheath material having a lower melting point than the core material.

3. A filter element in accordance with claim 1 wherein said core of said synthetic bicomponent fibers comprise at least one of polyester fibers, polyamid fibers, polyolefin fibers, thermoplastic polyurethane fibers, polyetherimide fibers, polyphenyl ether fibers, polyphenylene sulfide fibers, polysulfone fibers, and aramid fibers.

4. A filter element in accordance with claim 1 wherein said nonwoven synthetic fabric comprises a basis weight of about 100 g/m² to about 300 g/m².

5. A filter element in accordance with claim 1 wherein said bicomponent fibers comprise an average diameter of about 12 to about 18 microns.

6. A filter element in accordance with claim 1 wherein said plurality of nanofibers comprise an average diameter of about 500 nm or less, the nanofiber layer having a basis weight of about 0.6 g/m² to about 20 g/m².

7. A filter element in accordance with claim 1 wherein said plurality of corrugations comprise a plurality of alternating peaks and valleys extending a length of the composite filter media.

8. A filter element in accordance with claim 1 wherein said plurality of corrugations comprise alternating up and down substantially V-shaped corrugations.

9. A filter element in accordance with claim 1 wherein said composite filter media structure comprises a corrugation pitch of about 3 to about 10 corrugations per inch and an effective depth of at least about 0.02 inch.

10. A filter element in accordance with claim 1 further comprising a plurality of pleats.

11. A filter element comprising a first end cap, a second end cap, and a composite filter media structure, the composite filter media structure comprising:
 a base substrate comprising a nonwoven synthetic fabric formed from a plurality of bicomponent synthetic fibers with a spunbond process, said nonwoven synthetic fabric comprises a bond area of about 10% to about 14% of an area of said nonwoven fabric, said bond area pattern comprising a plurality of substantially parallel discontinuous lines of bond area, said base substrate having a minimum filtration efficiency of about 50%, measured in accordance with ASHRAE 52.2-1999 test procedure; and
 a nanofiber layer deposited on one side of said base substrate by an by electro-blown spinning process, said nanofiber layer comprising a plurality of nanofibers, said composite filter media structure having a minimum filtration efficiency of about 75%, measured in accordance with ASHRAE 52.2-1999 test procedure, said composite media structure further comprising an embossing pattern, said embossing pattern formed using opposing embossing rollers at a temperature of about 90° C. to about 140° C.

12. A filter element in accordance with claim 11 wherein the plurality of bicomponent fibers comprise a core material and a sheath material, the sheath material having a lower melting point than the core material.

13. A filter element in accordance with claim 11 wherein said core of said synthetic bicomponent fibers comprise at least one of polyester fibers, polyamid fibers, polyolefin fibers, thermoplastic polyurethane fibers, polyetherimide fibers, polyphenyl ether fibers, polyphenylene sulfide fibers, polysulfone fibers, and aramid fibers.

14. A filter element in accordance with claim 11 wherein said nonwoven synthetic fabric comprises a basis weight of about 100 $g/m^2$ to about 300 $g/m^2$.

15. A filter element in accordance with claim 11 wherein said bicomponent fibers comprise an average diameter of about 12 to about 18 microns.

16. A filter element in accordance with claim 11 wherein said plurality of nanofibers comprise an average diameter of about 500 nm or less, the nanofiber layer having a basis weight of about 0.6 $g/m^2$ to about 20 $g/m^2$.

17. A filter element in accordance with claim 11 wherein said embossing pattern comprises a plurality of pairs of a rib and a channel, the plurality of pairs spaced apart and arranged in staggered rows.

18. A filter element in accordance with claim 11 further comprising a plurality of pleats.

* * * * *